United States Patent
Huang et al.

(10) Patent No.: US 10,677,641 B2
(45) Date of Patent: Jun. 9, 2020

(54) FAN EXAMINATION METHOD AND FAN EXAMINATION SYSTEM

(71) Applicants: INVENTEC (PUDONG) TECHNOLOGY CORPORATION, Shanghai (CN); INVENTEC CORPORATION, Taipei (TW)

(72) Inventors: Yu-Hsien Huang, Taipei (TW); Tung-Lin Tsai, Taipei (TW); Wei-Liang Hsu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 376 days.

(21) Appl. No.: 15/867,510

(22) Filed: Jan. 10, 2018

(65) Prior Publication Data

US 2019/0154496 A1 May 23, 2019

(30) Foreign Application Priority Data

Nov. 23, 2017 (CN) .......................... 2017 1 1179537

(51) Int. Cl.
*G01N 29/42* (2006.01)
*G01H 3/08* (2006.01)
*G11B 27/36* (2006.01)

(52) U.S. Cl.
CPC .............. *G01H 3/08* (2013.01); *G01N 29/42* (2013.01); *G11B 27/36* (2013.01)

(58) Field of Classification Search
CPC ........ G01N 29/12; G01N 29/14; G01N 29/34; G01N 29/341; G01N 29/348; G01N 29/42; G01N 29/36; G01N 29/4409; G01N 29/4445; G01N 29/4454; G01N 29/4472; G01N 29/46; G01N 29/48; G01H 1/003; G01H 1/006; H05K 7/20209; H05K 7/20136; H05K 7/20

See application file for complete search history.

(56) References Cited

U.S. PATENT DOCUMENTS 10,558,548 B2 * 2/2020 Lobato ................. G01M 7/022

* cited by examiner

*Primary Examiner* — Kile O Blair
(74) *Attorney, Agent, or Firm* — Maschoff Brennan

(57) ABSTRACT

An examination method comprises: generating a received audio signal according to sound generated from rotation of the fan by an audio receiving device; performing Fourier transform on the received audio signal to obtain a reference frequency domain signal; recognizing a plurality of characteristic bands according to the reference frequency domain signal; adjusting the received audio signal according to the characteristic bands respectively to form a plurality of casting audio signals corresponding to frequency components in the characteristic bands respectively; playing the casting signals sequentially by an audio casting device; and recognizing at least one key band among the characteristic bands according to the transmission rate of the hard drive upon playing the casting signals.

10 Claims, 5 Drawing Sheets

FAN EXAMINATION METHOD AND FAN EXAMINATION SYSTEM

CROSS-REFERENCE TO RELATED APPLICATIONS

This non-provisional application claims priority under 35 U.S.C. § 119(a) on Patent Application No(s). 201711179537.9 filed in China on Nov. 23, 2017, the entire contents of which are hereby incorporated by reference.

TECHNICAL FIELD

This disclosure relates to a fan examination method and a fan examination system, particularly to a fan examination method and a fan examination system based on data transmission rate.

BACKGROUND

In the modern electronic device industry, products are requested to have small size as well as high computation efficiency and large data storage. However, heat dissipation is required more and thus the rotation of the cooling fan must be higher when the computation efficiency is higher. As a result, structure vibration and noise are thus hard to avoid. Moreover, the data storage density of a hard drive is raised when amount of the data storage is raised, requiring more accuracy of the control of the disk and the control of reading head in the hard disk.

In view of a server, vibration and noise caused by a fan rotating at high speed may affect the hard drive's data accessing, reducing the accessing efficiency of the hard drive, and even failing the data accessing. Therefore, a thorough understanding on vibration enduring ability of a hard drive and fan vibration reducing are really important for products like servers. Except for server industry, this problem is also bothersome to any electronic device having a fan.

Fan is one of the main vibration sources in a server, so the vibration issue of the server can be solved by reducing the vibration of a fan. However, excessive variation of rotation speed will affect heat dissipation ability of the fan. It is difficult to reduce fan vibration without changing the heat dissipation ability of the fan. As a feasible way, it is possible to lower the peak value of certain frequency or to shift the frequency of a peak by modifying the structure of the fan or the like.

In the past, diagram of relation between frequency and transmission rate is utilized for confirming which frequency band is the key factor affecting the transmission rate. However, the vibration magnitude should also be taken into consideration. In the traditional measurement, the input vibration may be too intense or too weak. The relation between the frequency and the transmission rate does not contain sufficient information when the input vibration is too weak. On the contrary, the relation between the frequency and the transmission rate is meaningless as well when the input vibration is too intense, and the hard drive may even be damaged by the strong vibration. Furthermore, high frequency vibration fades quickly in structure vibration. As a result, it is difficult to find a reasonable and discriminating vibration causing examination frequency.

Generally speaking, the hard drive and the fan are fixed at the case of an electronic device. Thus, the structure vibration generated from the rotation of the fan conveys to the hard drive through the case though the fan does not contact the hard drive directly. On the other hand, the sound is generated when the fan rotates. The sound may induce air-borne vibration on the hard drive through the air. The current measurement equipment merely focuses on the structure vibration but is unable to measure the air born vibration and effect caused thereby.

SUMMARY

According to one or more embodiments of this disclosure, an examination method for a fan based on a transmission rate of a hard drive, adapted to an electronic device including the hard drive and a fan, wherein the examination method comprises: generating a received audio signal according to sound generated from rotation of the fan by an audio receiving device, wherein a distance between the audio receiving device and the hard drive is within a default range while the audio receiving device is receiving the sound generated from rotation of the fan; performing Fourier transform on the received audio signal to obtain a reference frequency domain signal; recognizing a plurality of characteristic bands according to the reference frequency domain signal; adjusting the received audio signal according to the characteristic bands respectively to form a plurality of casting audio signals corresponding to frequency components in the characteristic bands respectively; playing the casting signals sequentially by an audio casting device, wherein the distance between the audio casting device and the hard drive is within the default range while the audio casting device is playing the casting signals; and recognizing at least one key band among the characteristic bands according to the transmission rate of the hard drive upon playing the casting signals.

According to one or more embodiment of this disclosure, an examination system for a fan, comprises an audio receiving device, an audio casting device and a control device, wherein the control device includes a memory module and a processor, with the memory module electrically connected to the processor, the memory module storing a plurality of instructions and the processor configured to perform the instructions, wherein the examination system is configured to perform the steps in said fan examination method when the processor performs at least one of the instructions.

BRIEF DESCRIPTION OF THE DRAWINGS

The present disclosure will become better understood from the detailed description given herein below and the accompanying drawings which are given by way of illustration only and thus are not limitative of the present disclosure and wherein.

DETAILED DESCRIPTION

Figure 1:
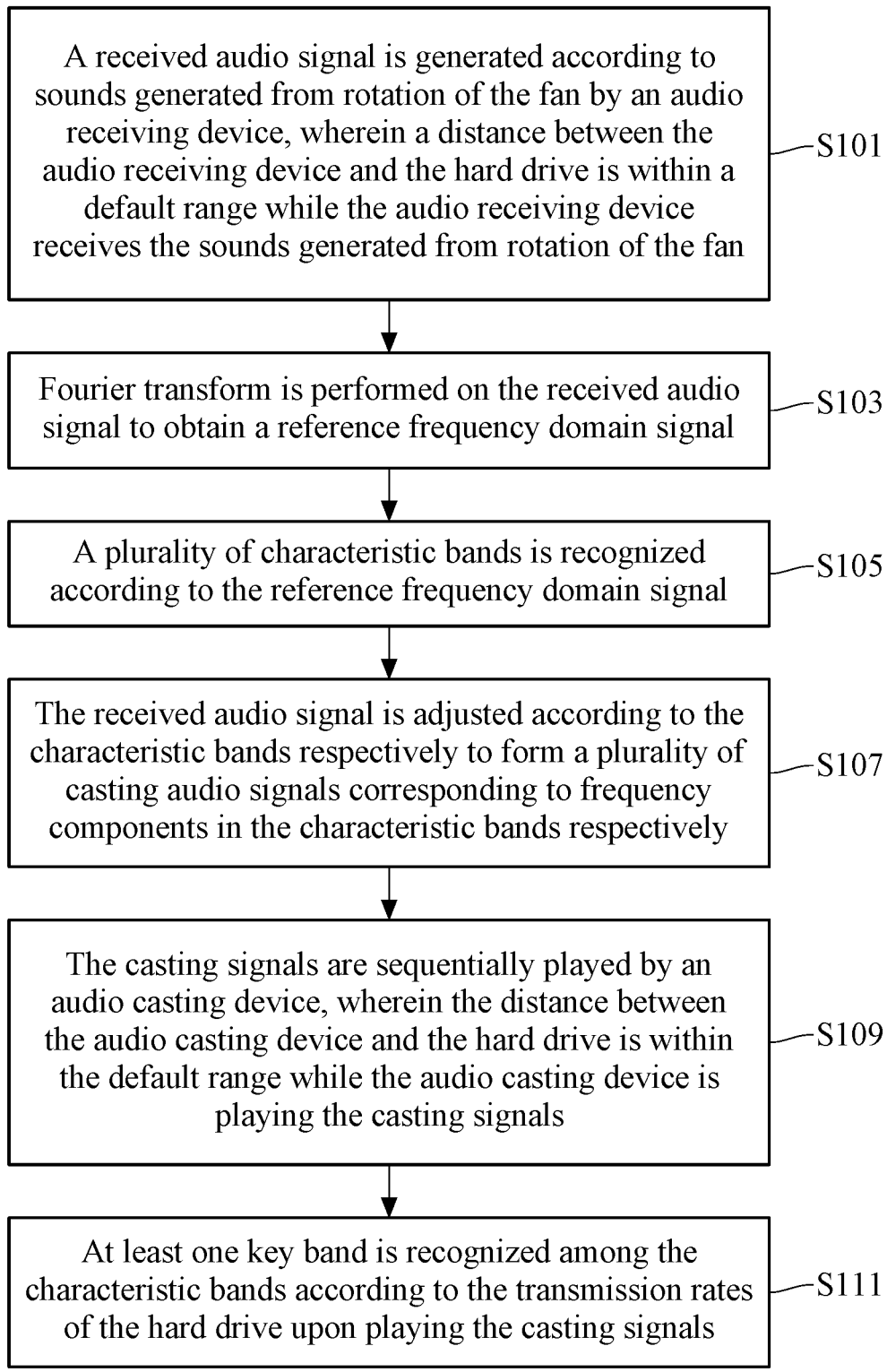
FIG. 1 is a flowchart of a fan examination method according to an embodiment of this disclosure.

Please refer to FIG. 1. FIG. 1 is a flowchart of a fan examination method according to an embodiment of this disclosure. The fan examination method is adapted for an electronic device. The electronic device includes a hard drive and a fan. The electronic device is, for example, a computer or a server. In step S101, a received audio signal is generated according to sounds generated from rotation of the fan by an audio receiving device, wherein a distance between the audio receiving device and the hard drive is within a default range while the audio receiving device receives the sounds generated from rotation of the fan. In step S103, Fourier transform is performed on the received audio signal to obtain a reference frequency domain signal. In step S105, a plurality of characteristic bands is recognized according to the reference frequency domain signal In step S107, the received audio signal is adjusted according to the characteristic bands respectively to form a plurality of casting audio signals corresponding to frequency components in the characteristic bands respectively. In step S109, the casting signals are played sequentially by an audio casting device, wherein the distance between the audio casting device and the hard drive is within the default range while the audio casting device is playing the casting signals. In step S111, at least one key band among the characteristic bands are recognized according to the transmission rates of the hard drive upon playing the casting signals.

Figure 2A:
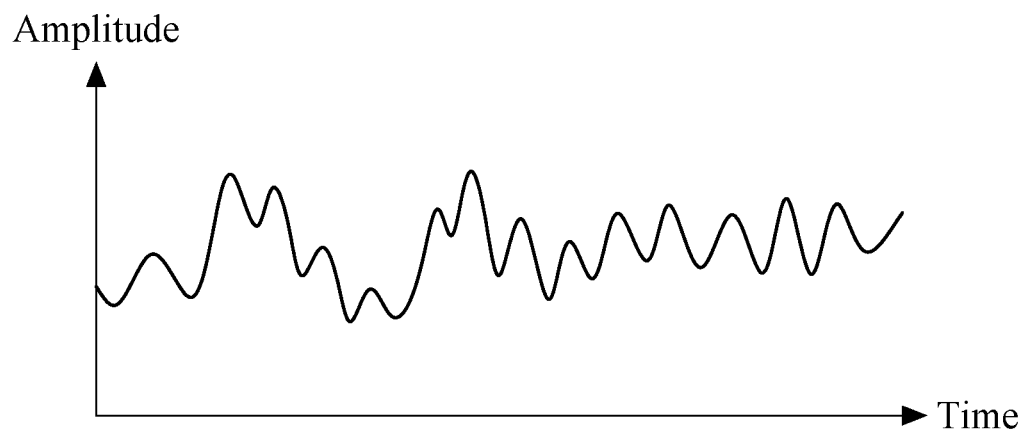
FIG. 2A is a diagram of a received audio signal according to an embodiment of this disclosure.
Figure 2B:
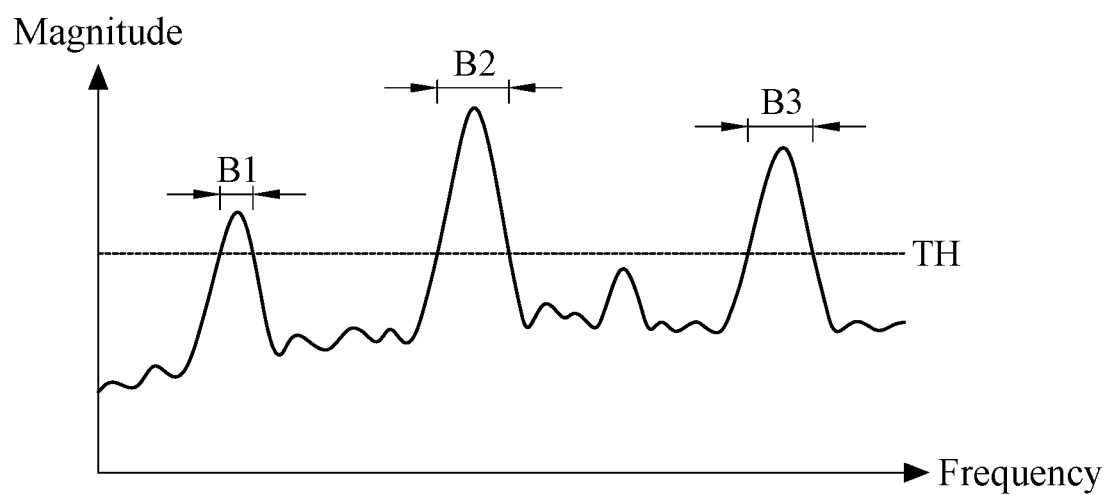
FIG. 2B is a diagram of a reference frequency signal according to an embodiment of this disclosure.

Please refer to FIG. 2A together with FIG. 2B. FIG. 2A is a diagram of a received audio signal according to an embodiment of this disclosure and FIG. 2B is a diagram of a reference frequency signal according to an embodiment of this disclosure. As shown in FIG. 2A, the received audio signal is a time domain signal obtained in the aforementioned step S101. The reference frequency signal is a frequency domain signal obtained by performing time-domain/frequency-domain transformation on the received audio signal. In one embodiment, the reference frequency signal is a frequency domain signal obtained by performing Fourier transform on the received audio signal. It should be noticed that the signal waveform in FIG. 2A and the spectrum in FIG. 2B are for exemplification only, which means the spectrum is not really a transformation result from the signal waveform in FIG. 2A. Therefore, specific definitions for the axes are omitted without unclarity.

Figure 3:
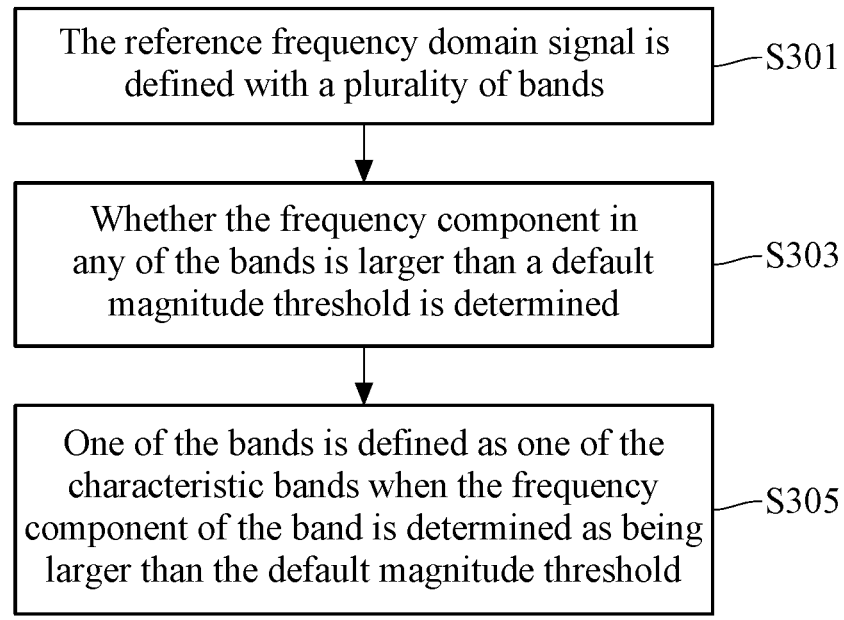
FIG. 3 is a flowchart of some steps of the fan examination method according to an embodiment of this disclosure.

Please refer to FIG. 3 in the next. FIG. 3 is a flowchart of some steps of the fan examination method according to an embodiment of this disclosure. In step S301, the reference frequency domain signal is defined with a plurality of bands. In step S303, whether the frequency component in any of the bands is larger than a default magnitude threshold is determined. In step S305, one of the bands is defined as one of the characteristic bands when the frequency component of the band is determined as being larger than the default magnitude threshold.

By the embodiment shown in FIG. 2B, the frequency components in a band B1, the frequency components in a band B2 and the frequency components in a band B3 are not less than a default threshold TH. Thus, the band B1, the band B2 and the band B3 are defined as characteristic bands. The mentioned "band" can be an equivalent to a frequency, depending on the equipment and the algorithm used in practice. For clarity, the "band" concept is adapted for description hereinafter.

Figure 4:
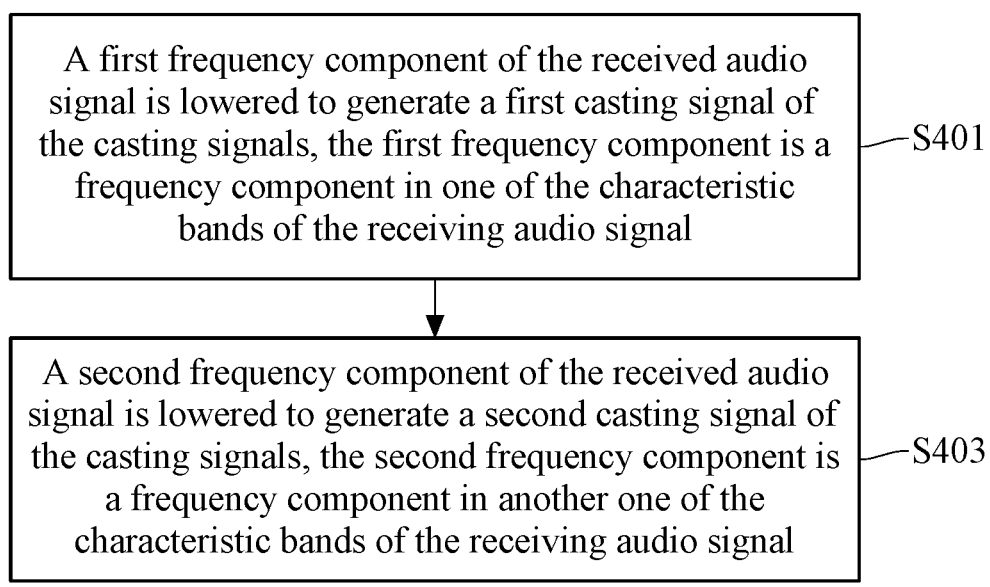
FIG. 4 is a flowchart of some steps of the fan examination method according to another embodiment of this disclosure.

Please refer to FIG. 4. FIG. 4 is a flowchart of some steps of the fan examination method according to another embodiment of this disclosure. In step S401, a first frequency component of the received audio signal is lowered to generate a first casting signal of the casting signals, and the first frequency component is a frequency component in one of the characteristic bands of the receiving audio signal. In step S403, a second frequency component of the received audio signal is lowered to generate a second casting signal of the casting signals, wherein the second frequency component is a frequency component in another one of the characteristic bands of the receiving audio signal.

Figure 5A:
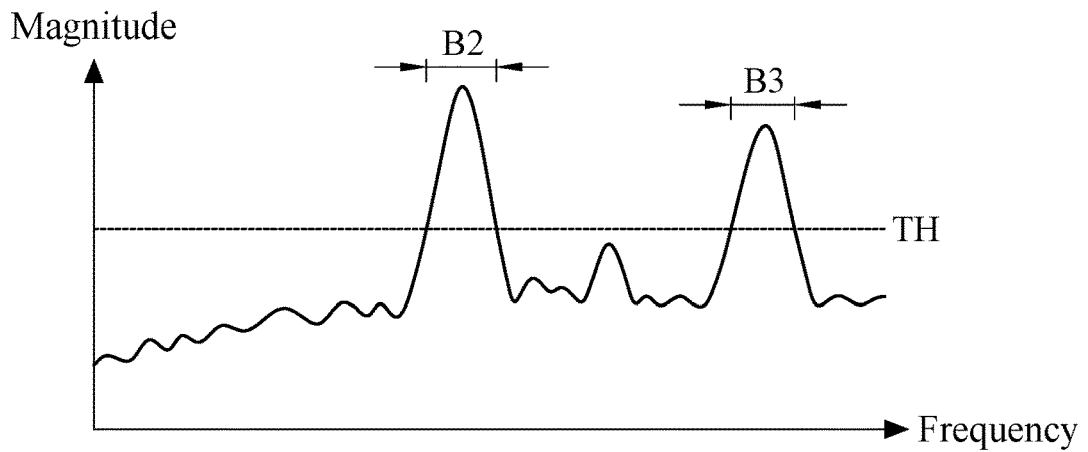
FIG. 5A is a diagram of the reference frequency signal with its frequency component in a band being lowered according to an embodiment shown in FIG. 2B of this disclosure.
Figure 5B:
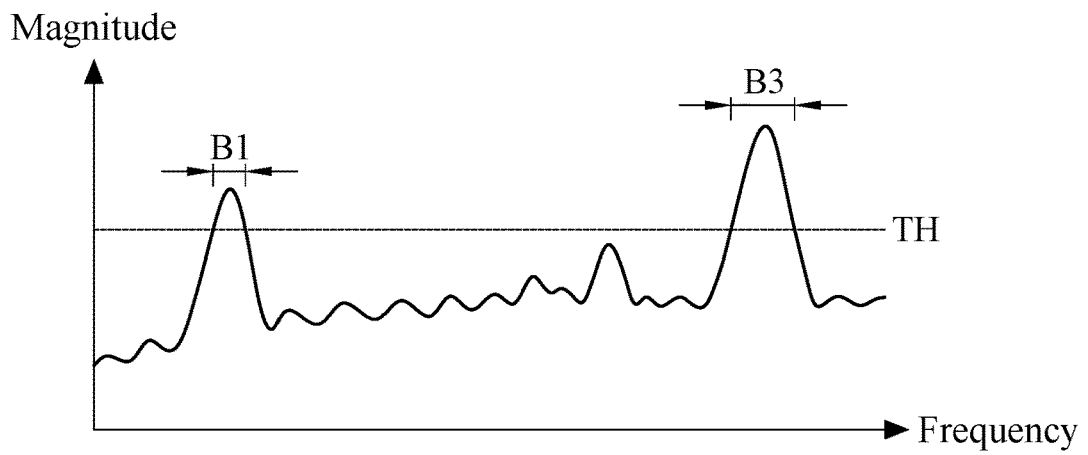
FIG. 5B is a diagram of the reference frequency signal with its frequency component in another band being lowered according to an embodiment shown in FIG. 2B of this disclosure.
Figure 5C:
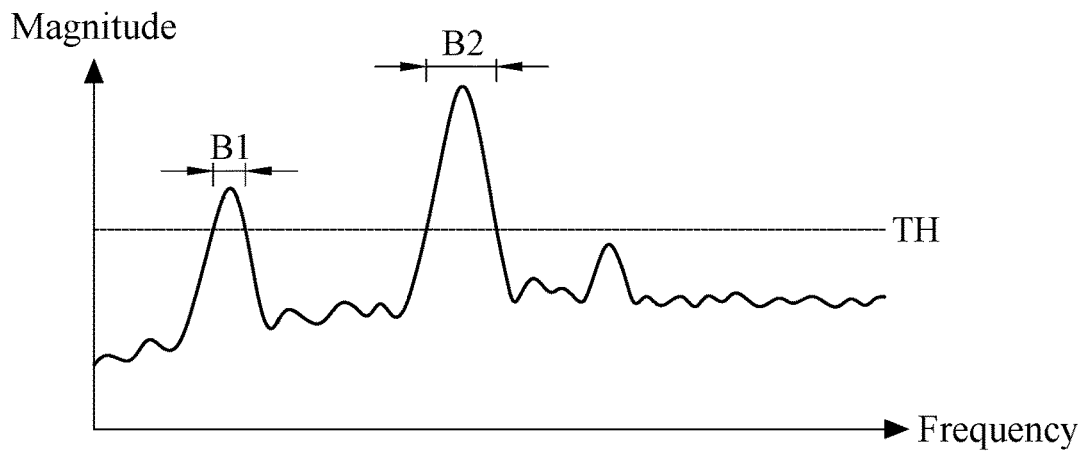
FIG. 5C is a diagram of the reference frequency signal with its frequency component in further another band being lowered according to an embodiment shown in FIG. 2B of this disclosure.

Pleas refer to FIG. 5A together with FIG. 5B and FIG. 5C. FIG. 5A is a diagram of the reference frequency signal with its frequency component in a band being lowered according to an embodiment shown in FIG. 2B of this disclosure. FIG. 5B is a diagram of the reference frequency signal with its frequency component in another band being lowered according to an embodiment shown in FIG. 2B of this disclosure. FIG. 5C is a diagram of the reference frequency signal with its frequency component in further another band being lowered according to an embodiment shown in FIG. 2B of this disclosure. As mentioned previously, band B1, band B2 and band B3 are defined as the characteristic bands. In FIG. 5A to FIG. 5C, frequency components in band B1, band B2 and band B3 are lowered in sequence.

More specifically, in the embodiment shown by FIG. 5A, the components of the reference frequency signal of FIG. 2B in band B1 are lowered and the spectrum shown in FIG. 5A is formed thereby. In the embodiment shown by FIG. 5B, the components of the reference frequency signal of FIG. 2B in band B2 are lowered and the spectrum shown in FIG. 5B is formed thereby. In the embodiment shown by FIG. 5C, the components of the reference frequency signal of FIG. 2B in band B3 are lowered and the spectrum shown in FIG. 5C is formed thereby. In practice, the frequency components of the bands can be lowered via one or more notch filters, and are not limit thereto. The frequency signals corresponding to spectrum in FIG. 5A to FIG. 5C are transformed to time domain signals as for the aforementioned casting signal. More specifically, the frequency signal corresponding to the spectrum in FIG. 5A is transformed into a first casting signal, the frequency signal corresponding to the spectrum in FIG. 5B is transformed into a second casting signal, and the frequency signal corresponding to the spectrum in FIG. 5C is transformed into a third casting signal.

Figure 6:
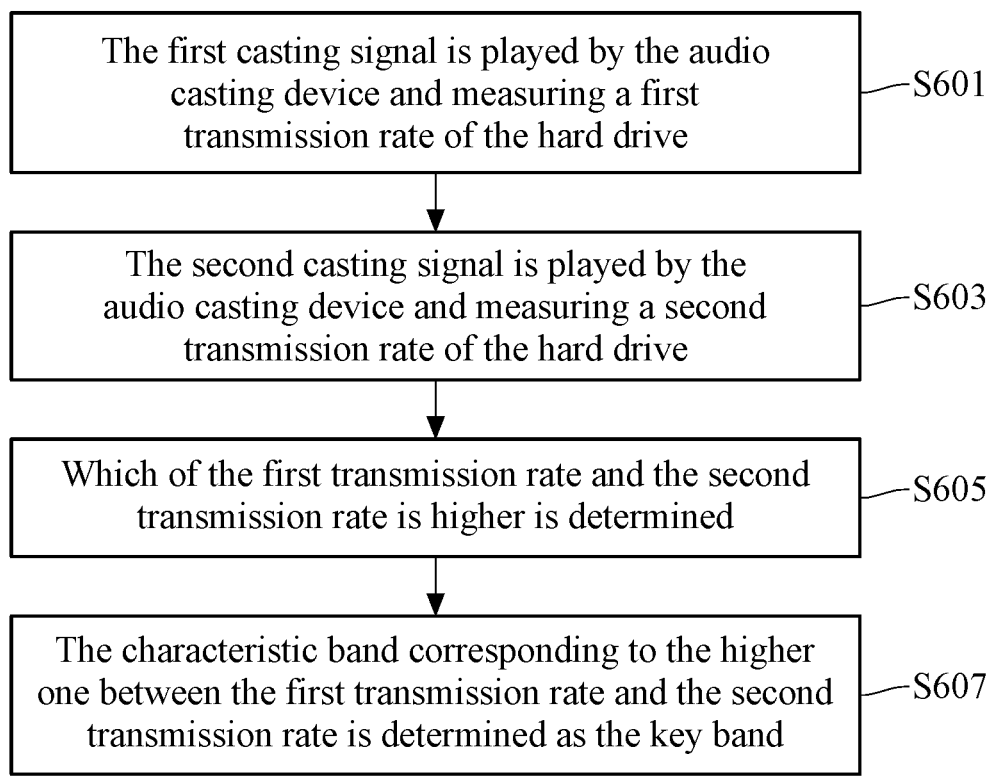
FIG. 6 is a flowchart of some steps of the fan examination method according to further another embodiment of this disclosure.

Please refer to FIG. 6. FIG. 6 is a flowchart of some steps of the fan examination method according to further another embodiment of this disclosure. In step S601, the first casting signal is played by the audio casting device and measuring a first transmission rate of the hard drive. In step S603, the second casting signal is played by the audio casting device and measuring a second transmission rate of the hard drive. In step S605, which of the first transmission rate and the second transmission rate is higher is determined. In step S607, the characteristic band corresponding to the higher one between the first transmission rate and the second transmission rate is determined as the key band.

By the embodiments shown in FIG. 5A, FIG. 5B and FIG. 5C, the frequency signals respectively corresponding to the spectrums in FIG. 5A, FIG. 5B and FIG. 5C are transformed into the first casting signal, the second casting signal and the third casting signal. The first casting signal, the second casting signal and the third casting signal are played in sequence. In an assumed scenario, the transmission rate of a hard drive upon playing the first casting signal is slower than the transmission rates upon playing the second and the third casting signal. Thus, the band B1 is defined as the key band. From another aspect, the frequency components in band B1 affect more on the transmission rate of the hard drive than other bands. With this information, the user or the designer can adjust the fan rotation or the fan mechanism to reduce the frequency component of the fan in the characteristic band.

Figure 7:
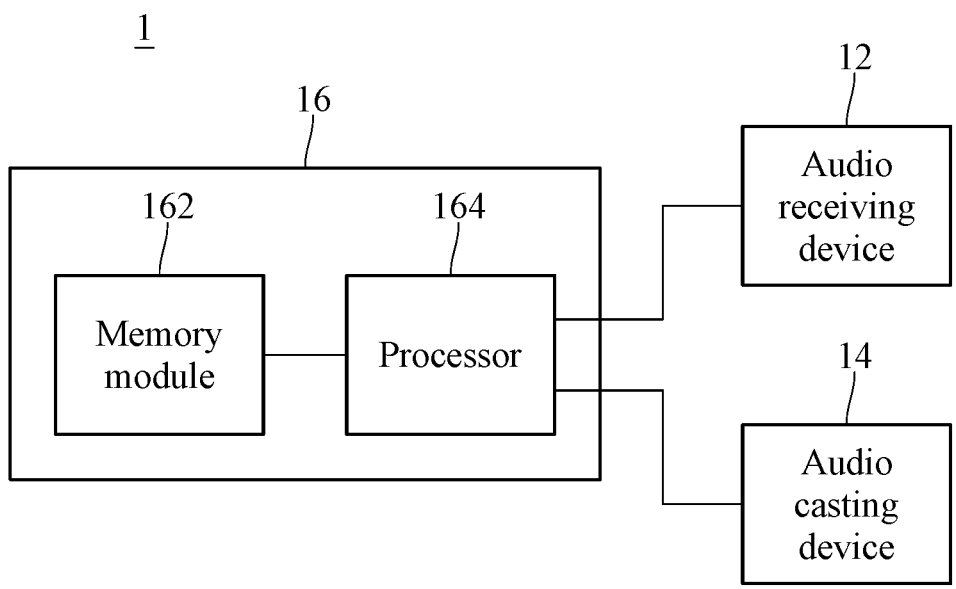
FIG. 7 is a function block diagram of a fan examination system according to an embodiment of this disclosure.

According to the above descriptions, this disclosure provides a fan examination system as well. Please refer to FIG. 7 for illustration on the fan examination system. FIG. 7 is a function block diagram of a fan examination system according to an embodiment of this disclosure. The fan examination system includes an audio receiving device 12, an audio casting device 14 and a control device 16. The control device 16 includes a memory module 162 and a processor 164. The processor is electrically connected to the memory module 162. The memory module 162 stores a plurality of instructions.

The processor 164 is configured to perform the instructions. When the processor performs the instructions, the fan examination is configured to perform the aforementioned fan examination method. The audio receiving device 12 can be a microphone. The audio casting device 14 can be a speaker. The control device 16 can be a computer or other device capable of computing. The memory module 162 can be volatile memory or non-volatile memory. The processor can be a central process unit (CPU). The above device are for exemplification only, and are not limited thereto.

In view of the above description, this disclosure provides a fan examination method and a fan examination system. By generating casting signals according to characteristic bands of the received audio signal and playing the casting signals, one or more key bands inducing more influence on the transmission rate of the hard drive can be recognized. More specifically, the user or the designer can define different limitations in order to define corresponding key bands according to the transmission rate of the hard drive. With the key band recognition, the user and the designer can adjust the fan mechanism or change the fan rotation control based on the key band. Thus, while raising the rotation speed of the fan for better heat dissipation ability, the fan vibration can be eased without affecting the transmission rate of the hard drive.

What is claimed is:

1. An examination method for a fan based on a transmission rate of a hard drive, adapted to an electronic device including the hard drive and a fan, wherein the examination method comprises:
   generating a received audio signal according to sound generated from rotation of the fan by an audio receiving device, wherein a distance between the audio receiving device and the hard drive is within a default range while the audio receiving device is receiving the sound generated from rotation of the fan;
   performing Fourier transform on the received audio signal to obtain a reference frequency domain signal;
   recognizing a plurality of characteristic bands according to the reference frequency domain signal;
   adjusting the received audio signal according to the characteristic bands respectively to form a plurality of casting audio signals corresponding to frequency components in the characteristic bands respectively;
   playing the casting signals sequentially by an audio casting device, wherein the distance between the audio casting device and the hard drive is within the default range while the audio casting device is playing the casting signals; and
   recognizing at least one key band among the characteristic bands according to the transmission rate of the hard drive upon playing the casting signals.

2. The examination method according to claim 1, wherein the step of adjusting the received audio signal according to the characteristic bands respectively to form the plurality of casting audio signals corresponding to frequency components of the characteristic bands respectively further comprises:
   lowering a first frequency component of the received audio signal to generate a first casting signal of the casting signals, the first frequency component is a frequency component in one of the characteristic bands of the receiving audio signal; and
   lowering a second frequency component of the received audio signal to generate a second casting signal of the casting signals, the second frequency component is a frequency component in another one of the characteristic bands of the receiving audio signal.

3. The examination method according to claim 2, wherein the step of playing the casting signals sequentially by an audio casting device and the step of recognizing at least one key band of the characteristic bands according to the transmission rate of the hard drive while the audio casting device is playing the casting signals further comprise:
   playing the first casting signal by the audio casting device and measuring a first transmission rate of the hard drive;
   playing the second casting signal by the audio casting device and measuring a second transmission rate of the hard drive;
   determining which of the first transmission rate and the second transmission rate is higher; and
   determining the characteristic band corresponding to the higher one between the first transmission rate and the second transmission rate as the key band.

4. An examination system for a fan, comprises an audio receiving device, an audio casting device and a control device, wherein the control device includes a memory module and a processor, with the memory module electrically connected to the processor, the memory module storing a plurality of instructions and the processor configured to perform the instructions, wherein the examination system is configured to perform the steps in claim 3, when the processor performs at least one of the instructions.

5. An examination system for a fan, comprises an audio receiving device, an audio casting device and a control device, wherein the control device includes a memory module and a processor, with the memory module electrically connected to the processor, the memory module storing a plurality of instructions and the processor configured to perform the instructions, wherein the examination system is configured to perform the steps in claim 2, when the processor performs at least one of the instructions.

6. The examination method according to claim 1, wherein the step of lowering the first frequency component of the received audio signal to generate the first casting signal of the casting signals comprises:

lowering the first frequency component of the reference frequency domain signal to generate a first frequency domain signal; and performing inverse Fourier transform on the first frequency domain signal to generate the first casting signal.

7. An examination system for a fan, comprises an audio receiving device, an audio casting device and a control device, wherein the control device includes a memory module and a processor, with the memory module electrically connected to the processor, the memory module storing a plurality of instructions and the processor configured to perform the instructions, wherein the examination system is configured to perform the steps in claim 6, when the processor performs at least one of the instructions.

8. The examination method according to claim 1, wherein the step of recognizing the plurality of characteristic bands according to the reference frequency domain signal further comprises:

defining the reference frequency domain signal with a plurality of bands;

determining whether the frequency component in any of the bands is larger than a default magnitude threshold; and defining one of the bands as one of the characteristic bands when the frequency component of the band is determined as being larger than the default magnitude threshold.

9. An examination system for a fan, comprises an audio receiving device, an audio casting device and a control device, wherein the control device includes a memory module and a processor, with the memory module electrically connected to the processor, the memory module storing a plurality of instructions and the processor configured to perform the instructions, wherein the examination system is configured to perform the steps in claim 8, when the processor performs at least one of the instructions.

10. An examination system for a fan, comprises an audio receiving device, an audio casting device and a control device, wherein the control device includes a memory module and a processor, with the memory module electrically connected to the processor, the memory module storing a plurality of instructions and the processor configured to perform the instructions, wherein the examination system is configured to perform the steps in claim 1, when the processor performs at least one of the instructions.

* * * * *